(12) United States Patent
Simon et al.

(10) Patent No.: US 8,392,612 B2
(45) Date of Patent: Mar. 5, 2013

(54) REPLICATION SERVER SELECTION METHOD

(75) Inventors: Steven N. Simon, San Jose, CA (US); David M. O'Rourke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1281 days.

(21) Appl. No.: 10/743,756

(22) Filed: Dec. 24, 2003

(65) Prior Publication Data
US 2005/0165962 A1 Jul. 28, 2005

(51) Int. Cl.
*G06F 15/16* (2006.01)
*G06F 11/00* (2006.01)
*H04M 1/24* (2006.01)

(52) U.S. Cl. ................. 709/245; 709/227; 714/2; 714/4; 379/22.01

(58) Field of Classification Search .................. 709/245, 709/227–229; 714/2, 4; 379/22.01
See application file for complete search history.

(56) References Cited

U.S. PATENT DOCUMENTS

| | | | | |
|---|---|---|---|---|
| 5,434,914 A | * | 7/1995 | Fraser | 379/219 |
| 5,526,489 A | * | 6/1996 | Nilakantan et al. | 709/228 |
| 5,687,320 A | * | 11/1997 | Wiley et al. | 709/245 |
| 6,006,333 A | * | 12/1999 | Nielsen | 726/8 |
| 6,014,660 A | * | 1/2000 | Lim et al. | 707/3 |
| 6,026,445 A | * | 2/2000 | Kephart et al. | 709/245 |
| 6,360,276 B1 | * | 3/2002 | Scott | 709/245 |
| 6,381,650 B1 | * | 4/2002 | Peacock | 709/245 |
| 6,795,434 B1 | * | 9/2004 | Kumar et al. | 370/392 |
| 6,810,411 B1 | * | 10/2004 | Coughlin et al. | 709/203 |
| 7,039,724 B1 | * | 5/2006 | Lavian et al. | 709/250 |
| 7,043,640 B2 | * | 5/2006 | Pritchard et al. | 713/184 |
| 2002/0023213 A1 | * | 2/2002 | Walker et al. | 713/168 |
| 2003/0074461 A1 | * | 4/2003 | Kang et al. | 709/230 |
| 2003/0177240 A1 | * | 9/2003 | Gulko et al. | 709/226 |
| 2003/0182433 A1 | * | 9/2003 | Kulkarni et al. | 709/228 |
| 2003/0196107 A1 | * | 10/2003 | Robertson et al. | 713/200 |
| 2004/0034705 A1 | * | 2/2004 | Focsaneanu | 709/225 |
| 2006/0168445 A1 | * | 7/2006 | Pitsos | 713/162 |

* cited by examiner

*Primary Examiner* — Guang Li
(74) *Attorney, Agent, or Firm* — Park, Vaughan, Fleming & Dowler LLP

(57) ABSTRACT

A method for a client computer to find a network address of a server computer by searching for the network address using at a backup search procedure if the address of the server computer cannot be identified using a primary search procedure. The primary and backup search procedures can be performed in parallel and multiple backup search procedures can be performed to identify the address of the server computer. Alternatively, the primary and backup search procedures can be performed in serial wherein the backup search procedure is performed only when the primary search procedure does not identify the address of the server computer.

4 Claims, 3 Drawing Sheets

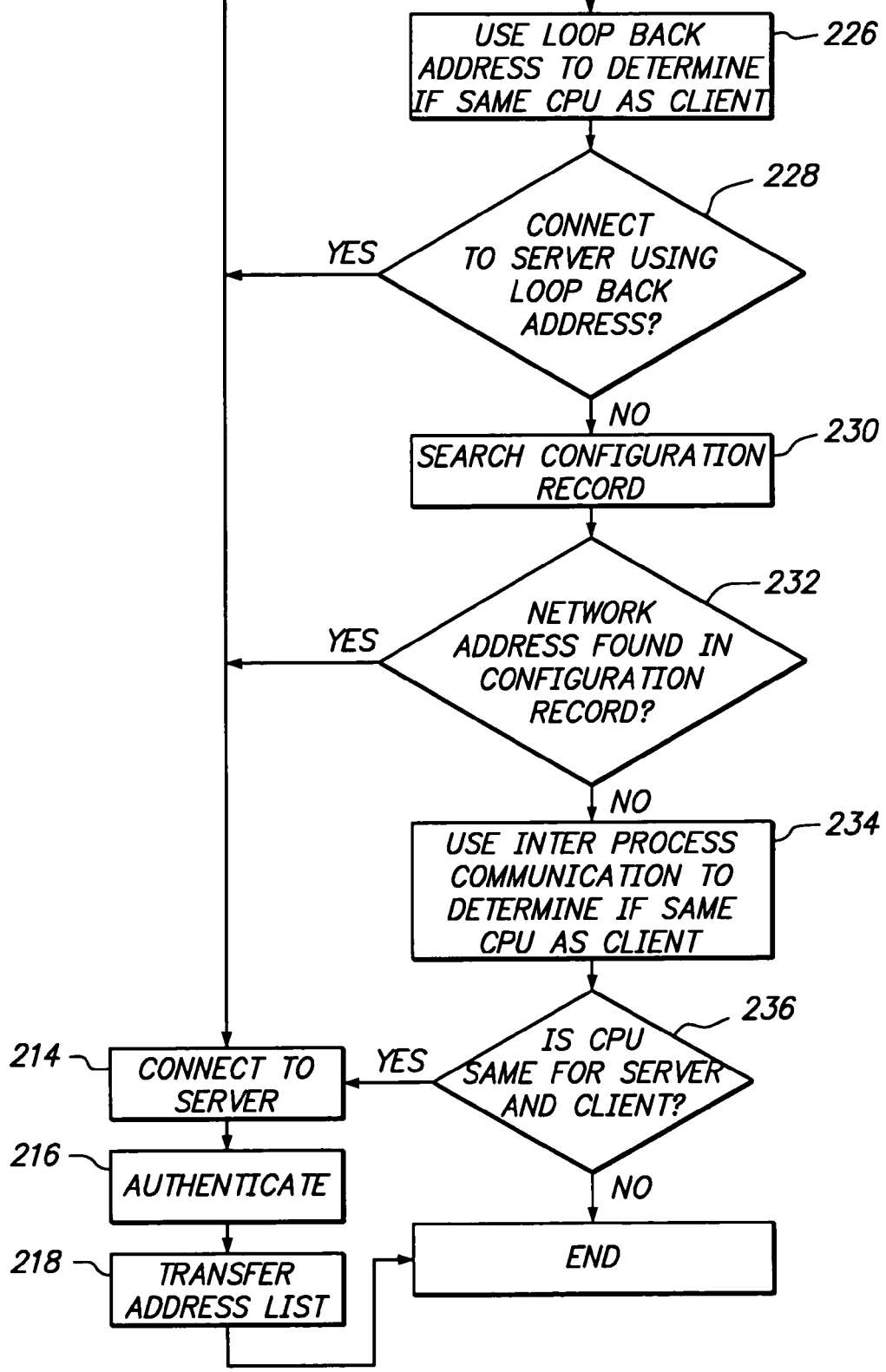

REPLICATION SERVER SELECTION METHOD

FIELD OF THE INVENTION

The present invention generally relates to computer networks and more particularly to a method of identifying replicated computers on the network.

BACKGROUND OF THE INVENTION

In a network computing environment, computers can be replicated in order to provide redundant sources of information. Specifically, the information on one computer can be copied onto one or more other computers in order to provide redundancy. For example, password server computers can be replicated in order to ensure that a password server computer is always available for use by a client computer. Each of the computers on the network communicate with one another through the use of a defined protocol.

Computers can be added and removed from the network as needed. Therefore, each computer needs to have information about the other current computers on the network in order to communicate. Typically, a computer will have an address list of all available computers. The list needs to be updated in order to find the other computers on the network. Each computer needs to have the address of the other computers in the network in order to contact each other.

A method for determining the network address of computers on the network requires a requesting computer to contact a network computer that maintains an updated list of network addresses. In this regard, one of the computers of the network maintains an updated list of updated network addresses for the other computers in the network. The requesting computer will know the address of the computer maintaining the list and contact that computer for the addresses of the other computers on the network. If the computer maintaining the list is disconnected from the network, then requesting computers cannot easily determine the addresses of the other computers on the network.

Another method of identifying computers on the network is to broadcast a message over the network seeking information about all computers on the network. When one of the computers responds, then the list of active computers on the network can be updated. However, this process can be time consuming and waste network resources.

SUMMARY OF THE INVENTION

The method of the present invention provides a layered approach to providing the addresses of network computers and provides redundant finding capabilities for improved efficiency. In accordance with the present invention there is provided a method for a client computer to find a network address of a server computer by using a backup search procedure if the address of the server computer cannot be identified using a primary search procedure. The search procedures can be performed in parallel and include searching a local storage of the client computer as the primary search procedure. If this procedure fails to identify the network address of the server computer, then a backup search procedure such as searching a configuration record of the client computer for the network address is performed. It will be recognized by those of ordinary skill in the art that different types of search procedures can be combined in different combinations as the primary and backup search procedures.

Typically, the server computer is a password server computer having a public key. The client computer uses the public key to search for the address of the server computer. Once the address of the server computer is known, the client computer attempts to establish a connection and authenticate the server. If a connection is established, then the server computer transmits an address list of all replicated servers to the client computer. The address list is stored in the local storage of the client computer and is used to contact the other server computers when needed.

In addition to the foregoing, a backup search procedure can be transmitting a broadcast message over the network to identify the address of the server computer. The public key of the server computer can be used in the broadcast message to identify the server computer. If the address is found, then the client attempts to establish a connection. However, if the address is not found using the broadcast message, then another backup procedure such as using an authentication record of the server computer can be used to find the network address. Specifically, the client computer searches the authentication record using the public key of the server computer. If the address is found from the authentication record, then the client computer attempts to establish a connection.

However, if a connection cannot be established, then another backup search procedure is for the client computer to determine if the server is running on the same CPU as the client computer. The client computer can use either a loop back address or inter process communication to determine if the same CPU is being used by the client computer and the server computer. If the same CPU is being used, then the client computer knows the network address of the server computer and attempts to establish a connection. However, if the same CPU is not being used, then the client computer does not know the address of the server computer and cannot establish a connection.

By using a primary and backup search procedure, it is more likely to identify replicated servers. The primary and backup search procedures may be performed in either a serial or parallel manner. When the search procedures are performed in parallel, then the primary and backup procedures are performed concurrently and the results from the backup procedure are used if the primary procedure does not identify the server computer. When the search procedures are performed serially, then the primary search procedure is performed and the backup search procedure is only performed when the primary search procedure does not identify the server computer. Furthermore, it is possible to perform more than one backup procedure if the primary search procedure does not identify the server computer. Multiple backup procedures can be used to identify the server computer.

BRIEF DESCRIPTION OF THE DRAWINGS

These, as well as other features of the present invention, will become more apparent upon reference to the drawings wherein.

DETAILED DESCRIPTION

Figure 2A:
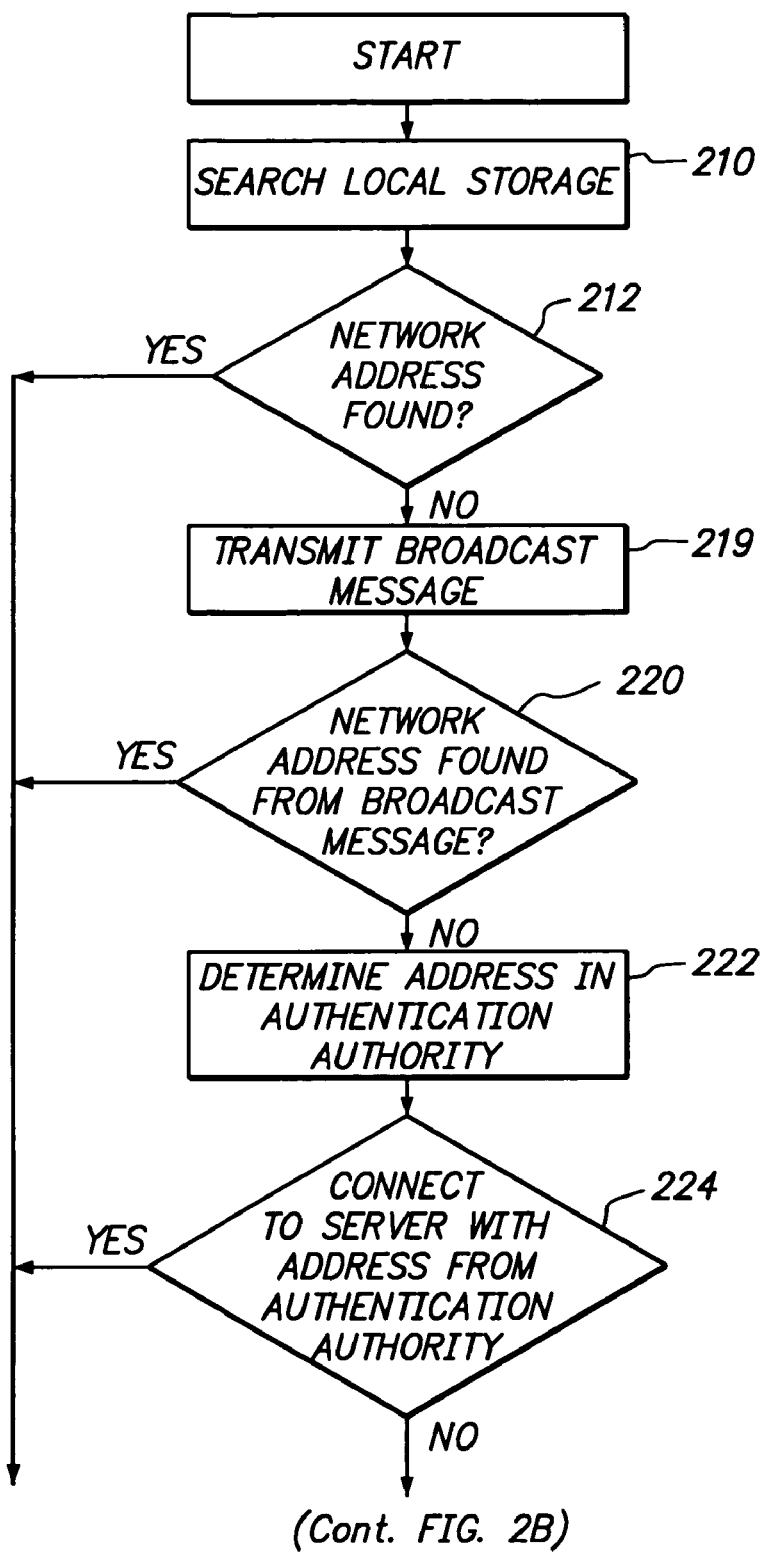
FIG. 2 is a flowchart illustrating the method of the present invention.

Various aspects of the present invention will now be described in connection with exemplary embodiments, including certain aspects described in terms of sequences of actions that can be performed by elements of a computer system. For example, it will be recognized that in each of the embodiments, the various actions can be performed by specialized circuits, circuitry (e.g., discrete and/or integrated logic gates interconnected to perform a specialized function), program instructions executed by one or more processors, or by any combination. Thus, the various aspects can be embodied in many different forms, and all such forms are contemplated to be within the scope of what is described. The instructions of a computer program as illustrated in FIG. 2 for finding an address of a server computer can be embodied in any computer-readable medium for use by or in connection with an instruction execution system, apparatus, or device, such as a computer-based system, processor containing system, or other system that can fetch the instructions from a computer-readable medium, apparatus, or device and execute the instructions.

As used here, a "computer-readable medium" can be any means that can contain, store, communicate, propagate, or transport the program for use by or in connection with the instruction execution system, apparatus, or device. The computer-readable medium can be, for example but is not limited to, an electronic, magnetic, optical, electromagnetic, infrared, or semiconductor system, apparatus, device, or propagation medium. More specific examples (a non exhaustive list) of the computer readable-medium can include the following: an electrical connection having one or more wires, a portable computer diskette, a random access memory (RAM), a read only memory (ROM), an erasable programmable read only memory (EPROM or Flash memory), an optical fiber, or a portable compact disc read only memory (CDROM).

Figure 1:
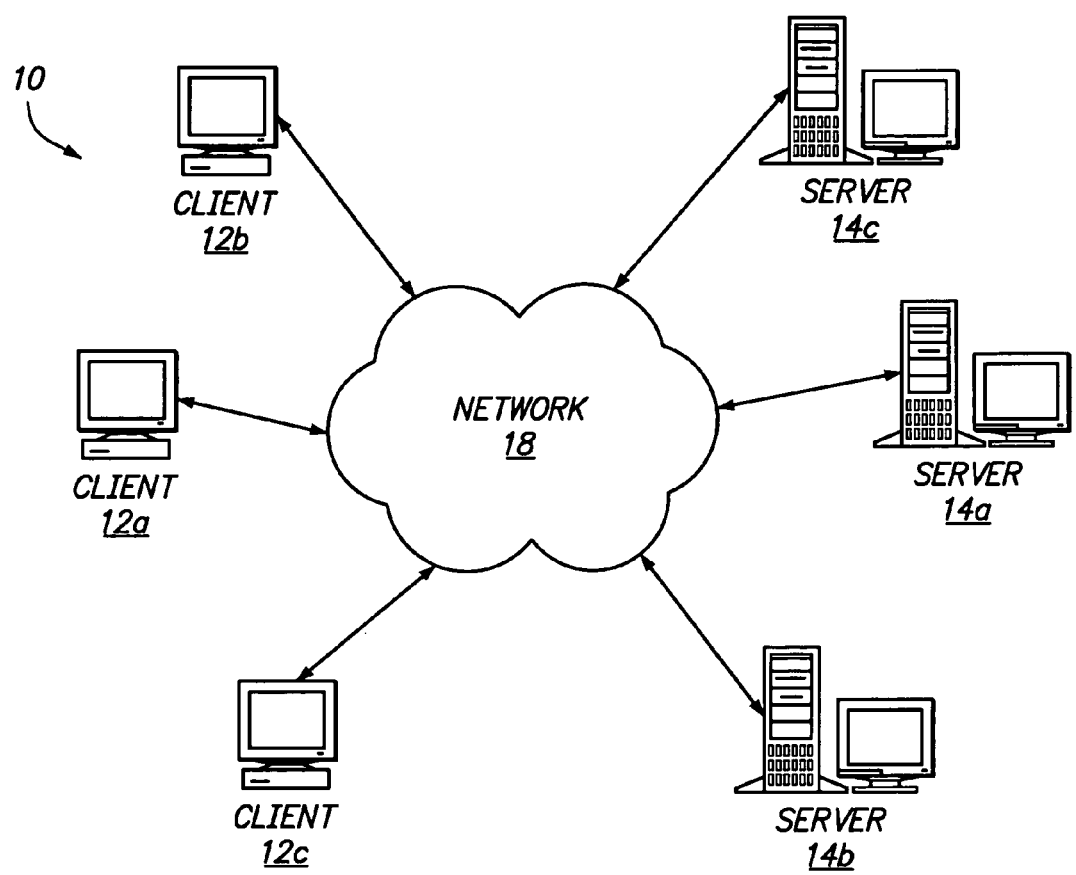
FIG. 1 is a diagram for a computer network of replicated computers.

Referring now to the drawings wherein the showings are for purposes of illustrating preferred embodiments of the present invention only, and not for purposes of limiting the same, FIG. 1 is a diagram showing a system 10 having client computers (i.e., clients) 12a-12c connected to a physical network 18. Also connected to the network 18 are password server computers (i.e., password servers) 14a-14c. Each of the password servers 14 contains the same information such that they are replicated on the network. For example, client 12a can contact any one of the password servers 14a, 14b or 14c to verify a password. Replication is the ability of multiple independent computers (i.e. CPU, storage, network interfaces and any other components necessary for a fully independent computer device) to share data and keep that data synchronized. For this example, the data to be synchronized is the set of password data for an entire network of computers. In a replicated system, the switch over between servers 14 should be transparent to the client 12 in order to provide a seamless network transition in the event of mobility and/or password server failure.

In the system 10, when a client 12 needs to verify a password, it contacts a password server 14 for verification services. Typically, the user will type his or her username and password into a login window of the client 12. The login window verifies the existence of a user record using a configured directory of the system. If the user record exists in the directory system, the login window passes the name and password to a security framework of the system. The security framework then passes the name and password to the operating system directory services of the client 12 which retrieves the user record from the directory system and reads a data value called the "authentication authority" (i.e. authentication record) associated with the user record. The authentication authority indicates that the user's password is stored in a password server 14. The authentication authority contains three values: 1) the public key of the designated password server; 2) a 128-bit number uniquely naming a single password stored in the password server; and 3) a network address that is a likely network address of the password server. The network address may be an IPv4 address, IPv6 address or a resolvable domain name using the DNS system. After retrieving and parsing the authentication authority, the operating system of the client 12 contacts the password server 14 using the network address. Next, the operating system conducts a secure network authentication method before trusting the password server 14. The client 12 challenges the password server to a public-key/private-key verification step as is commonly known. Using the public key, the client 12 crafts a challenge that only a valid private key holder can properly answer. The password server 14 either succeeds or fails the authentication attempts such that access is either granted or denied.

The method of password authentication by the password server 14 is performed by each of the replicated password servers 14. All of the password servers 14 will have the same public key/private key and list of user passwords. Therefore, each of the password servers 14 can be named by the public key. The public key and private key are created using standard cryptography techniques as is commonly known. The public key is used to verify the authenticity of a password server 14, as well as serve as a name for the password server 14.

As stated above, after retrieving and parsing the authentication authority, the client 12 attempts to contact the designated password server 14 using the network address. However, if the password server 14 is not connected to the network, then a connection cannot be made. The operating system of the client 12 will then need to find another password server 14 for verification.

Referring to FIG. 2, a method for finding the network address of other password servers 14 connected to the network 18 is shown. Specifically, the operating system of the client 12 attempts to find the address of the other password servers 14 verify and authenticate the password. The order of steps shown in FIG. 2 is an example of one way in which a client 12 can identify a password server 14. It will be recognized by those of ordinary skill in the art that the order of steps illustrated in FIG. 2 can be performed in different orders as necessary. In step 210, the operating system of the client 12 attempts to find a list of network addresses for the replicated password servers 14 in a system local storage using the password server system's public key as an index. As previously discussed, each replicated password server 14 has the same public key such that it can be used to identify all of the replicated password servers 14. The public key is used to find records that will have the network address. If the address of the password server 14 is found in the local storage of the client 12 at step 212, then the process proceeds to step 214 where the operating system of the client 12 attempts to establish a network connection with the server 14. Once the connection has been established, then the password server 14 is authenticated using the public key/private key verification in step 216. If the password server 14 is authenticated, then access to the password server 14 is granted. In step 218, a list of password server addresses for known replica password servers 14 is transmitted and stored in the local storage of the client 12. The list is used to populate the local storage cache of the client 12. As long as the local storage cache of the client 12 contains correct network addresses for the password servers 14, the process of finding the address of a password server 14 occurs in step 214.

However, if the network address of the password server 14 is not found in the local storage, the process proceeds from step 212 to step 219 where the operating system of the client 12 uses a broadcast technique to resolve the network address of the password server 14. Specifically, the operating system of the client 12 uses the broadcasting capability of the network 18 to transmit the public key of the password server 14 and await a response. In step 220, if the network address is found by broadcasting the public key, then the process proceeds to steps 214-218 to establish and authenticate a network connection as previously described.

In step 220, if the broadcast message does not resolve the network address of a password server 14, then the process proceeds to step 222 where the password server address from the authentication authority is contacted. As previously described, the authentication authority includes an address of a password server 14. In step 224, the operating system of the client 12 attempts to contact the password server 14 using the address from the authentication authority. If the attempt is successful, then the process proceeds to steps 214-218 where the connection is established and the password server 14 is authenticated.

If the attempt to contact the password server 14 in step 224 is not successful, then the process proceeds to step 226. The operating system of the client 12 determines if the password server 14 is running on the same CPU as the client 12. Specifically, the client 12 uses a TCP/IP loop back address (127.0.0.1) as the address of the password server 14. If the password server 14 is running on the same CPU as the client 12, then a connection can be established using the loop back address. In step 228, if the connection is established, then the process proceeds to steps 214-218 to authenticate the connection and retrieve the password server addresses.

However, if a connection cannot be established using the loop back address in step 228, the process proceeds to step 230 where the operating system of the client 12 attempts to find a network address of a password server 14 from the configured directory system. Specifically, the name of the record in the directory system is the public key of the password server 14 and the record contains the network address of a password server 14. In step 230, if the network address for the password server 14 is in the configuration record, the process proceeds to step 214 where the client 12 attempts to establish a network connection to the server 14. The process then proceeds through steps 216 and 218 to authenticate the network connection and populate the local storage of the client 12 with the network addresses of replica password servers 14.

However, if a connection cannot be established using the configuration record in step 232, then the process proceeds to step 234 where an inter process communication (IPC) is used to determine if the password server 14 is running on the same CPU as the client 12. The IPC mechanism can determine the processes running on the CPU. If the password server 14 is running on the same CPU as the client 12, then the IPC can determine this and the address for the password server 14 is the same as the client 12 such that a connection can be established. In step 236, the address of the client 12 is used to establish a connection if the server 14 is running on the same CPU. If a connection can be established, then the process proceeds to steps 214-218 where the password server 14 is authenticated. However, if the server 14 is not on the same CPU, then the process ends without the address of the password server being found.

In most instances, the address of the password server 14 will be found by searching the local storage of the client 12 in step 210. Even if the process proceeds to the other steps, the next time that the address for a password server 14 is needed, it will be in the local storage of the client 12 because the list of password server addresses is updated in step 218.

The steps shown in FIG. 2 have been shown in a sequential order. However, it is possible to perform the steps in parallel in order to shorten the time to retrieve the address of the server 14. The searching and connection attempts on the network are done in parallel to minimize the wait time for a client in the instance that one of the password servers 14 is sluggish or unavailable in responding. In such a case, the start of each search and connection attempt can be staggered in order to allow searches and connection attempts that are more probable to succeed a chance to complete. For example, the search of the configuration record 214 may begin before the search of the local storage 210 has been completed in order to shorten the wait time if the search of the local storage 210 does not succeed. The time before the next step occurs depends on the type of operation being performed in order to allow the previous operation a chance of succeeding.

Additionally, it is possible to perform the identification procedure without performing all of the steps enumerated in FIG. 2. For example, in order to identify the password server 14, the method may be implemented by searching local storage in step 210 and if that does not succeed then only transmitting a broadcast message in step 219. In this regard, the method shown in FIG. 2 illustrates a primary or first identification procedure and if that fails then performing at least one backup procedure for identifying the server 14.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The preceding description illustrated an example where an address of a password server was needed. However, it will be recognized that the addresses of other types of servers (i.e. web, file, etc.) can be found with the method of the present invention. Therefore, the embodiment illustrated is just one example and is not intended to be limiting of other embodiments. The scope of the invention is indicated by the appended claims, rather than the foregoing description, and all changes that come within the meaning and range of equivalents thereof are intended to be embraced.

What is claimed is:

1. A method for a client computer to locate a network address of a password server computer on a computer network, said password server computer having a public key that is an identifier of the password server computer, the method comprising:
    searching for the address of the password server computer in a local system storage of the client computer; and
    performing a backup search procedure if the address is not found in the local system storage, the backup search procedure being selected from a group of search procedures consisting of the following:
        broadcasting a message over the network to identify the address of the password server computer,
        searching an authentication record for the address of the password server computer,
        using a loop back address,
        using a inter process communication to determine whether the password server computer is running on a same CPU as the client computer in order to determine the network address, and
        searching a configuration record of the client computer for the address of the password server computer; and
    establishing a connection with the password server computer using the network address found,
    wherein:

one or more of said search procedures searches for the password server computer using the public key as at least part of a search query to identify the server computer, and the public key identifies a plurality of password server computers having different network addresses.

2. The method of claim 1, wherein the backup search procedure is performed in parallel with searching the local system storage of the client.

3. A system for finding a network address, the system comprising:

password server, comprising a processor, and means having a network address and a public key, the public key being an identifier of the password server means; and client means that comprises a processor for:

searching for the network address of the password server means by searching for the address of the password server means in a local system storage of the client means, using a backup search procedure to identify the address of the password server means if the address is not found in the local system storage, and establishing a connection with the password server means using the network address found, wherein, when the client means is configured to search for the network address as the backup search, the backup procedure is selected from a group of search procedures consisting of the following:

broadcast a message over the network to find the address of the password server means, search an authentication record for the address of the password server means, use a loop back address, use a inter process communication to determine whether the password server means is running on a CPU that is the same CPU on which the client is running means in order to determine the network address, and search a configuration record of the client means for the address of the password server means; and wherein:

one or more of said search procedures searches for the password server means using the public key as at least part of a search query to identify the server means, and the public key identifies a plurality of server computers having different network addresses.

4. The system of claim 3, wherein the backup search procedure is performed in parallel with searching for an address of the password server means in a local system storage.

\* \* \* \* \*